May 23, 1967 R. M. EWALD 3,321,283
APPARATUS FOR CONDUCTING RAPID CHEMICAL REACTIONS
Filed Dec. 23, 1963 2 Sheets-Sheet 1
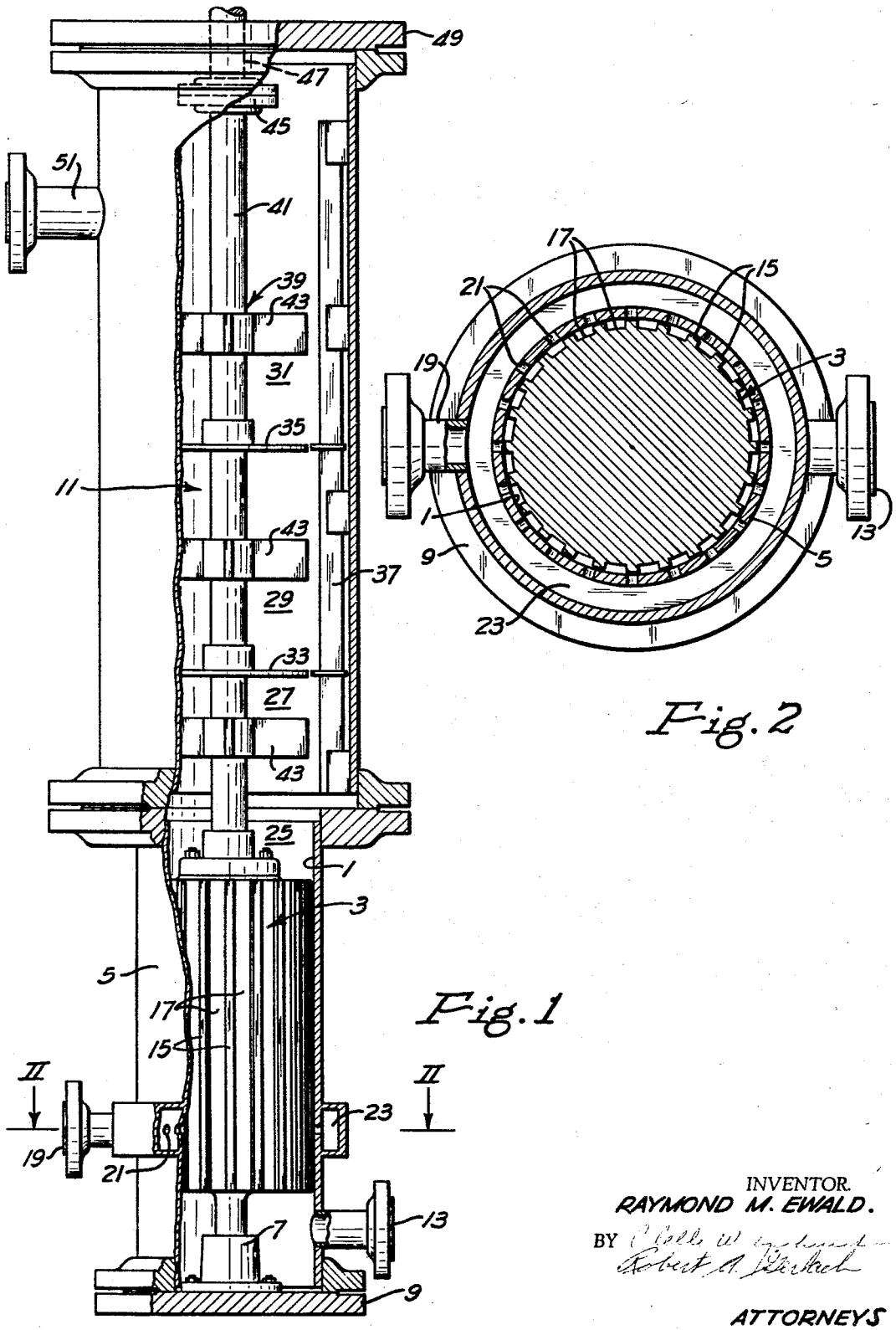
INVENTOR.
RAYMOND M. EWALD.
BY
ATTORNEYS

INVENTOR.
RAYMOND M. EWALD

BY

ATTORNEYS

United States Patent Office 3,321,283
Patented May 23, 1967

3,321,283
APPARATUS FOR CONDUCTING RAPID
CHEMICAL REACTIONS
Raymond M. Ewald, New Martinsville, W. Va., assignor to Mobay Chemical Company, Pittsburgh, Pa., a corporation of Delaware
Filed Dec. 23, 1963, Ser. No. 332,416
2 Claims. (Cl. 23—283)

This invention relates to a method and an apparatus for conducting rapid chemical reactions. More particularly, it relates to a method and apparatus for the preparation of organic isocyanates by the phosgenation of the corresponding amine.

It has been heretofore known to conduct the reaction of organic amines with phosgene in a high speed mixer at temperatures up to about 80° C. in a first step and then subjecting the product thus formed to an additional quantity of phosgene at higher temperatures. It also has been heretofore known in U.S. Patent 2,822,373 to continuously introduce under pressure, phosgene into an inert solvent under turbulent flow in a closed path, continuously introducing an organic amine into the phosgene solution, exhausting the reaction mixture into a zone of lower pressure and isolating the isocyanate. Further, the organic solvent solution of the isocyanate may be recycled around the closed path.

The yield in the production of isocyanates is reduced by simultaneously occurring reactions which are undesirable. For example, even where phosgene is introduced in substantial excess, localized concentrations of organic amine result in the reaction of 2 mols of amine with 1 mol of phosgene to produce low molecular weight, undesirable urea-containing by-products. This is the most serious side reaction. Another reaction, however, occurs after the corresponding isocyanate is formed which is the reaction of the isocyanate product with unreacted amine. This reaction also occurs very rapidly and is therefore difficult to control if the isocyanate product is permitted to come in contact with the unreacted amine.

The aforementioned patent relates primarily to laboratory experiments wherein the feed rates of amines are less than 3.3 pounds per hour. In working with rapid reactions such as between amines and phosgene, the yield decreases as the flow rates of the reactants increase. This is due to the larger quantities of reactants to be mixed, which requires longer time periods in order to disperse one reactant in the other. As this period of time becomes longer, because of the larger quantities of reactants to be mixed, the dispersal time, which is defined as the period of time for one reactant to become completely mixed with respect to the other reactant, becomes large in comparison to the half-life of the reaction.

It is therefore an object of this invention to provide an improved method for the preparation of organic isocyanates. It is another object of this invention to provide an improved apparatus for rapidly mixing two fluid streams together. It is still another object of this invention to provide an improved apparatus for the preparation of organic isocyanates. It is a further object of this invention to provide a method and apparatus which minimizes the occurrence of side reactions in cases whose reaction rate is high. It is still another object of this invention to provide an improved method and apparatus for preparing organic isocyanates in greater yields. It is another object of this invention to provide a method and apparatus to attain high isocyanate yields at high production rates. It is still another object of this invention to provide an apparatus which will dispense one reactant solution in another at a speed at least 40 times faster than the devices heretofore known in the art. It is still a further object of this invention to provide a method and apparatus for dispersing one reaction solution in another to obtain better than 90% homogeniety in 0.005 second. It is a further object of this invention to provide an apparatus to disperse a solution of organic amine in a solution of phosgene in less time than the half-life of the reaction.

The foregoing objects and others which will become apparent from the following description are accomplished in accordance with the invention, generally speaking, by providing a method and apparatus for rapidly combining two different solutions by continuously introducing an excess of a solution of phosgene in an inert solvent into a plurality of restricted discrete dispersal zones, introducing a solution of an organic amine in an inert solvent into the dispersal zones through a plurality of passageways, continuously discharging the mixture formed in each of the dispersal zones into each of a plurality of reaction zones, such that the residence time within each of said dispersal zones is less than the half-life of the phosgene-amine reaction, there being one reaction zone for each dispersal zone, subjecting each of the dispersal and reaction zones to a shearing action and collecting the product from each of the reaction zones. The apparatus for conducting this process, includes a chamber having walls defined by a surface of rotation, and a rotor disposed and closely fitting within the chamber. The rotor has a plurality of lands and grooves, the grooves of which constitute the reaction zones. Means are provided for the introduction of phosgene solution and for the introduction of amine solution into the grooves.

Where the half-life of a reaction is on the order of 0.005 to 0.1 second, it is extremely important to reduce the dispersal time especially where competing reactions lower the yield. By operating the apparatus in accordance with this invention according to the method described nearly complete dispersal of one reactant in the other takes place in less time than the half-life of the reaction. Thus, the reactants are completely mixed before half of the heat of reaction is evolved. Since the reaction rate is reduced two or three fold for each 10° C. reduction in temperature, the reaction rate is reduced during the initial mixing period and the first part of the reaction period. This reduces side reactions. In addition, where solids result as is the case where amines are reacted with phosgene, formation of a heavy slurry is avoided in the initial dispersal zone. The reaction of phosgene with amine is accomplished with the formation of HCl and phosgene vapor. These vapors cause cavitation of conventional mixing devices. By the method of this invention, cavitation is avoided because it is possible to utilize lower temperatures and also because only partial reaction takes place in the initial mixing zone. As stated above, high yields are readily obtained in laboratory or pilot plant, but the yield falls off in large scale operation. The apparatus in accordance with this invention has a capacity of from about 50 to about 75 million pounds per year with yields of about 94 percent of theoretical.

The foregoing objects and others will also become apparent from the accompanying drawings in which like reference characters illustrate like parts and in which:

FIGURE 1 is a cut away section elevation of one embodiment of an apparatus in accordance with this invention.

FIGURE 2 is a sectional view taken along lines II—II of FIGURE 1.

Figure 4:
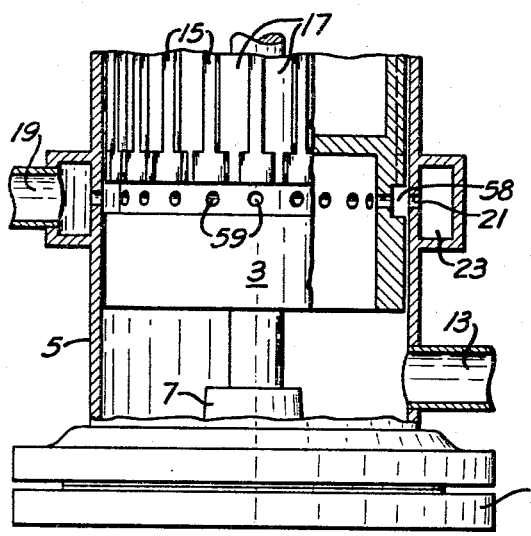
FIGURE 4 is a partial section elevation of another embodiment in accordance with this invention.

As stated above, the reaction velocity of phosgene with amines is extremely rapid; therefore, even where phosgene is present in excess, by-products result because of the reaction of 2 mols of amine with 1 mol of phosgene. This can occur because of an excessive time period for dispersing the amine in the phosgene solution. Under conditions of large scale production, involving large flows of the two reactants, it is very difficult to disperse the reactants fast enough to maintain high yields. The process of this invention overcomes these difficulties by introducing the phosgene into a plurality of restricted discrete dispersal zones. These zones are continuously subjected to intense turbulence resulting from the kinetic energy in the jet streams and to shearing action. The amine solution is then introduced into the plurality of restricted, discrete dispersal zones by maintaining the volume of these zones in the vicinity where the amine solution is introduced, as small as possible to insure that the residence time therein is less than the half-life of the reaction. The amine is rapidly dispersed within the phosgene solution thus increasing the yield by decreasing the side reactions. The dispersed solution then immediately passes into a plurality of reaction zones. It is preferred that the amine be intermittently introduced into the phosgene solution in order to continuously provide a flushing action of the dispersal and reaction zones by phosgene solution. This aids in preventing the localized concentration of amine solution and also back mixing of products with reactants. The process thus involves the continuous passing of the phosgene solution through the reaction zones while introducing into the phosgene solution the amine solution. The mixture in both the dispersal and reaction zones is, all during this time, subjected to a shearing action and the resulting product thereby produced is collected from each of the reaction zones. The phosgene solution is introduced into the reaction zone under a pressure of from about 50 to about 100 lbs./in.$^2$, while the amine solution is introduced at pressures of from about 50 to about 150.

In an alternate embodiment of this invention, conditions almost as favorable are achieved by introducing both reactant solutions at high velocity through a plurality of holes into a small mixing chamber under intense turbulence and then to a reaction zone.

The phosgene is introduced at a rate such that the molar ratio of phosgene to amine is at least 25% stoichiometrical excess. That is, the phosgene is introduced at a rate so at least 1.25 mol of phosgene is present per equivalent of amine. Usually a much greater excess is used. The feed rates are controlled by conventional methods which are not part of this invention. A steady, non-pulsing, dependable controlled flow of feed streams is essential.

The temperature within the reaction zone can vary from 0° C. to about 200° C. preferably, however, it is maintained at a temperature of from 50 to about 90° C.

For manufacturing diisocyanates using orthodichlorobenzine as the solvent, the solvent to amine ratio is maintained at from about 6:1 to about 25:1 parts by weight; however, in order to obtain the maximum yield per unit of time, it is preferred that the solvent to amine ratio be maintained from about 8:1 to about 14:1. For manufacturing monoisocyanates, the solvent to amine ratio may be much lower, depending on the solvent employed. With parachlorophenyl isocyanate and dichlorophenyl isocyanate, solvent to amine ratios as low as 1:1 can be employed with some solvents.

The phosgene solution concentration is maintained at from about 10% to about 30% and preferably from about 15% to about 25%.

The amine solution concentration is maintained at from about 10% to about 30% and preferably from about 15% to about 25%.

It is preferred that the phosgenation process in accordance with this invention be followed by a second step commonly referred to as a "hot phosgenation" step about 100° C. to about 300° C. while introducing additional phosgene.

The process of this invention is applicable for the preparation of an organic isocyanate such as, for example, alkyl, cycloalkyl, alkaryl, aralkyl, heterocyclic and aryl, mono-, di- and polyisocyanates. The isocyanates are useful as intermediates in producing many valuable materials. For example, they may be reacted with organic compounds containing active hydrogen containing groups in the molecule such as, for example, hydroxyl polyesters and polyesteramides, polyhydric polyalkylene ethers and thioethers, polyacetals and the like to produce polyurethanes in the form of cellular or elastromeric products. The cellular products are useful as insulating materials, seat cushions, pillows and the like. The elastromeric materials are useful as automobile tires, valve buttons, diaphragms, gears, accumulator bladders, bellows and the like.

Illustrative examples of isocyanates, which may be prepared in accordance with the process of the present invention, by reaction of phosgene with the corresponding primary amine, are hexyl isocyanate from hexylamine, octyl isocyanate from octylamine, dodecyl isocyanate from dodecylamine, octadecyl isocyanate from octadecylamine, tetramethylene diisocyanate from tetramethylene diamine, pentamethylene diisocyanate from pentamethylene diamine, hexamethylene diisocyanate from hexamethylene diamine, octamethylene diisocyanate from octamethylene diamine, undecamethylene diisocyanate from undecamethylene diamine, dodecamethylene diisocyanate from dodecamethylene diamine, 3,3'-diisocyanato dipropylether from 3,3'-diaminodipropylether, etc.; cyclohexyl isocyanate from cyclohexylamine, tetrahydro-α-napthyl-isocyanate from tetrahydro-α-naphthylamine, tetrahydro-β-naphthyl isocyanate from tetrahydro-β-naphthylamine, etc.; xylylene diisocyanates from xylylene diamines, diphenylmethane, 4,4'-diisocyanate from 4,4'-diamino diphenylmethane, β,β'-diphenylpropane 4,4'-diisocyanate from 4,4'-diamino-β,β'-diphenylpropane, etc.; benzyl isocyanate from benzylamine, phenylethyl isocyanate from phenylethylamine; p-isocyanato benzyl isocyanate from p-amino-benzylamine, etc.; phenyl isocyanate from aniline, o-chlorophenylisocyanate from o-chloroaniline, m-chlorophenyl isocyanate from m-chloroaniline, p-ethoxyphenyl isocyanate from p-ethoxyphenylamine, p-methoxyphenyl isocyanate from p-anisidine, p-cetylphenyl isocyanate from p-cetylaniline; p-dodecylphenyl isocyanate from p-dodecyl aniline, 5-dodecyl-2-methylphenyl isocyanate from 5-dodecyl-o-toluidine, 3-nitro-4-dodecyl phenylisocyanate from 3-nitro-4-dodecyl aniline; p-cetyloxyphenyl isocyanate from p-cetyloxyaniline, metaphenylene diisocyanate from metaphenylene diamine, p-phenylene diisocyanate from p-phenylene diamine, 2,4-tolylene diisocyanate from 2,4-tolylene diamine, napthylene-1,4-diisocyanate from 1,4-naphthylene diamine, 2,6-tolylene diisocyanate from 2,6-tolylene diamine, 1,3,3-benzene triisocyanate from 1,3,5-benzene triamine, 2,4,4'-triisocyanato diphenylether from 2,4,4'-triaminodiphenyl ether etc.; tetrahydrofurfuryl isocyanate from tetrahydrofurfurylamine, furfurylidene diisocyanate from furfurylidene diamine and the like.

The process of this invention is preferably conducted for the preparation of aromatic isocyanates and particularly for the production of tolylene diisocyanates and 4,4'-diphenylmethane diisocyanate.

Any suitable solvent or suspension agent may be used, such as, for example, benzene, toluene, xylylene, chlorobenzene, dichlorobenzene, tetrahydronaphthalene, chlorotoluenes, chlorinated aromatic hydrocarbons, including chlorinated diphenyls, nitrobenzene, cyclohexane, kerosene, benzine, carbontetrachloride, tetrachloroethylene, trichloroethylene, chlorobenzene, tetrahydronaphthalene amylbenzene, o-, m- and p-cymenes, dodecylbenzene, naphthalene, heptylcyclopentane, ethyl acetate, diphenyl, chlorinated diphenyls, heptane, dioxane, dibutyl ether, diisobutyl ketone and the like.

Referring specifically to the drawings, FIGURES 1 and 2 show one embodiment in this invention. FIGURE 1 is a partially cut away sectional elevation and FIGURE 2 is a cross-sectional view taken along lines II—II of FIGURE 1. In these figures, a cylindrical first chamber 1 is shown having a rotor 3 co-axially disposed therein. The rotor 3 is journaled in a bearing 7 at the lower end of the chamber 1. The chamber 1 itself is formed by a side wall 5 which is a surface rotation and by the bottom end wall 9. The top of the chamber 1 opens into a second chamber 11. By surface of rotation is meant any surface which can be formed by rotation of a line about an axis. This includes not only straight lines at an angle with the axis which would result in conical sections or frustoconical cross-sections and also curved and broken lines such as a series of lines which would appear as steps and arcs. Thus, it is not essential that a chamber have any given geometrical configuration, but can be almost any design as long as the rotor 3 has a comparable design. The chamber 1 is provided with a first inlet 13 in the wall 5 below the bottom of the rotor 3. The rotor 3 itself has a plurality of lands 15 and grooves 17 as shown in FIGURE 2 which in FIGURE 1 runs the length thereof. The rotor 3 fits closely within the chamber 1 and rotates freely therein. The chamber 1 is provided with a second inlet 19 which includes a series of apertures 21 through the wall 5 of the chamber 1 and a small jacket portion 23 around the outer periphery of the chamber 1 which provides a conduit for transporting a liquid to the apertures 21. The fluid to be introduced passes through the jacketed portion 23 through the apertures 21 in the wall 5 of the chamber 1 and into the grooves 17 of the rotor 3. The lands 15 of the rotor 3, as they pass adjacent to any of the apertures 21 provided in the chamber 1 substantially prevents the introduction of fluid from the jacketed portion 23 into the chamber 1. However, when a groove 17 is adjacent, an aperture 21 in the chamber wall 5, the fluid within the jacketed portion 23 is permitted to enter the chamber 1. Thus, intermittent introduction of the fluid maintained in the jacketed portion 23 into the grooves 17 is achieved. An area 25 above the rotor 3 and within chamber 1 is maintained where the reaction mixtures or the products thereof are collected and then passed from the chamber 1 in a body into a second chamber 11 which as shown, is divided into three sections 27, 29 and 31 by baffles 33 and 35. The second chamber 11 is also provided with vertical baffles 37 and an agitator 39 including a shaft 41 and impellers 43 extending from shaft 41. At least one impeller 43 is located in each of the sections 27, 29 and 31. The shaft 41 is coaxial with rotor 3 and mechanically connected thereto at the lower end. The upper end of the shaft 41 is connected by a coupling 45 to a shaft 47 that is driven by a motor (not shown). The shaft 47 is journaled in a bearing in the top wall 49 of the second chamber 11. Near the top of chamber 11, there is provided a discharge outlet 51 where the reaction product is removed. This may be connected to any suitable hot phosgenation apparatus.

In operation for the production of an isocyanate, a phosgene solution enters the chamber 1 through the first inlet 13 and passes in an upward direction through the grooves 17 in the rotor 3. The portion of the grooves 17 adjacent the apertures 21 are the zones wherein the amine solution is dispersed into the phosgene solution. The area of the grooves 17 above this portion is the reaction zone. The rotor 3 is continuously rotated by means of a suitable drive mechanism (not shown), at a rate of from about 100 to about 1200 r.p.m.'s. The phosgene solution passes up through the grooves 17 and is substantially maintained within the groove 17 in which it initially enters because it is bound by the bottom of the groove 17, the sides of the adjacent lands 15 and the juxtaposed portions of the side walls 5 of the chamber 1. The amine solution is introduced intermittently through the holes 21 provided in the chamber wall 5. The reaction mixtures then pass in an upward direction in the grooves 17 while the rotor 3 continuously rotates. Following each entrance of the amine solution, the portion of the grooves 17 adjacent the aperture 21 is flushed with phosgene solution because of the continuous nature of its introduction. The mixtures are then collected in the area 25 and then into the second chamber 11 where they pass from section 27 to 29 to 31. While in chamber 11 the mixtures are continuously agitated due to the action of impellers 43, vertical baffles 37 and horizontal baffles 33 and 35.

Figure 3:
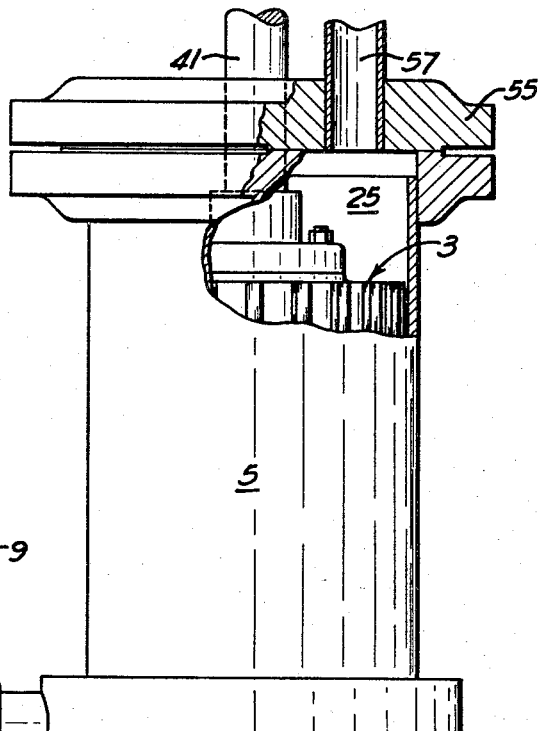
FIGURE 3 is a partly cut away view of an embodiment similar to FIGURE 1.

FIGURE 3 is similar to FIGURE 1, however, it illustrates an embodiment wherein the chamber 1 is closed at the upper end by a plate 55. The plate 55 includes an opening in which shaft 41 is journaled and a discharge outlet 57. The phosgene and amine solutions enter through inlets 13 and 19 respectively, pass up through the grooves 17 of the rotor 3 as shown in FIGURE 1, are collected in area 25 and then pass out through discharge outlet 57 to other apparatus which completes the reaction.

FIGURE 4 is a partial cut away section elevation of an embodiment in which the non-moving parts are identical to FIGURE 1, but the rotor 3 is a different design. In the apparatus, the phosgene solution passes through inlet 13 into a space below the rotor and flows radially through moving holes 59 and enters a small mixing chamber or dispersal zone 58. The amine solution enters through non-moving holes 21 and enters the chamber 58. In this manner, the two reactants enter the chamber 58 in a plurality of opposing high velocity continuous streams with the phosgene solution also having a high rotational speed. The mixed liquids enter the grooves 17 in the rotor 3 where the reaction proceeds under conditions of extreme turbulence as in FIGURE 1.

Figure 5:
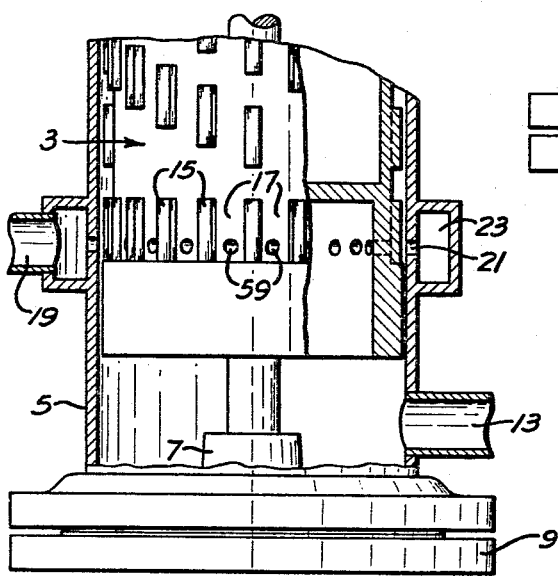
FIGURE 5 is still another embodiment in accordance with this invention.

The apparatus shown in FIGURE 5 is similar to that of FIGURE 3 with the exception that the rotor 3 is further modified and includes lands 15 and grooves 17 arranged in parallel fashion only in the vicinity in which the amine solution is introduced into the phosgene solution. These lands 15 and grooves 17 run only a short-longitudinal length of the rotor 3. The phosgene solution enters the grooves 17 in a manner similar to that shown in FIGURE 4 by passing through holes 59 provided in the rotor 3. The lands operate in a manner described above with regard to FIGURE 1 causing the intermittent introduction of the amine solution into the grooves 17. This embodiment differs from the embodiment shown in the first three figures in that the entire body of the reaction mixture is reunited shortly after the amine solution is introduced and dispersed. This portion of the rotor carries a plurality of protrusions which further agitate and shear the reaction mixture. Because of the present behind the introduction of both of the solutions, the reaction mixture continuously passes in an upward direction until it either passes out of a discharge outlet or into a second reaction chamber as that shown in FIGURE 1.

It is pointed out that while all of the figures describe cylindrical reaction chambers and rotors disposed therein, it is not necessary that these chambers be cylindrical. For example, it may be advantageous to use a conical shaped or frusto shaped chamber. By this alteration, the distance between the chamber walls and the rotor can be adjusted by moving the rotor up to down thereby moving the rotor toward or away from the walls of the chamber. It is also found that the shape of the chamber and the rotor may be that of a barrel. One similarity, however, throughout all of these embodiments is that any given horizontal cross-section through the apparatus is substantially a circle.

The invention is further illustrated but not limited by

Example 1

Into an apparatus in accordance with FIGURE 1 is introduced by way of the first inlet 13, a 20% solution of phosgene in ortho dichlorobenzene at a rate of about 130 gallons per minute. This solution continually passes up through the grooves 17 in the rotor 3 which is continually rotated at a rate of 840 r.p.m. The rotor 3 has a diameter of about 12″, a length of about 30″ and has 20 lands 15 and 20 grooves 17. The grooves 17 are ⅛″ deep and 1.4″ wide. The lands 15 are approximately ½″ wide. A 20% solution of an isomeric mixture of tolylene diamine approximately 80% 2,4- and 20% 2,6- in an orthodichlorobenzene is introduced at a rate of 48 gallons per minute into the grooves 17 through the second inlet 19. This inlet includes 24 holes 21 through the chamber wall 5 equally spaced around the circumference thereof. As the rotor 3 rotates and the grooves 17 become aligned with the holes 21, the tolylene diamine solution enters and mixes with the phosgene solution. Thus, it can be seen that 6720 separate introductions of tolylene diamine solution are made per second:

(840 r.p.m.÷60 seconds)(24 holes)
 (20 ribs)=6720 introductions per second

The phosgene solution is maintained at a temperature of about 20° C. and is introduced at a pressure of about 125 p.s.i.g. The tolylene diamine solution is maintained at a temperature of about 80° C. and is introduced at a pressure of about 75 p.s.i.g. The temperature within the grooves 17 is about 50 to 70° C. The residence time within the grooves 17 under these conditions is about 0.15 second. The time required to disperse the TDA solution is on the order of 0.004 second. The TDA solution per introduction amounts to about 0.52 gram. While the DA solution is shut off, the amount of phosgene solution which flows as a flush amounts to about 0.51 gram. The peripheral speed at 840 r.p.m. is 44 ft./second and the upward flow velocity in the channels is 16 ft./second.

The discrete reaction mixtures are collected in the area and pass continuously into another vessel at atmospheric pressure having a stirrer where the reaction mixture is heated to a temperature of about 150° C. for a residence time of about 2 hours while adding phosgene. Excess phosgene and HCl are removed and the solvent is recovered from the product by distillation. The product is purified by further distillation.

The method of phosgenation described in this example results in a yield of tolylene diisocyanate of about 94% of theoretical.

Example 2

Into an apparatus in accordance with FIGURE 4, is introduced, by way of the first inlet 13, a 20% solution of phosgene in orthodichlorobenzene at a rate of about 130 gallons per minute. This solution flows in high velocity jet streams out of the 20 holes 59 in the rotor. A 20% solution of tolylene diamine in orthodichlorobenzene is introduced at a rate of 48 gallons per minute through the 24 holes 21. The amine solution from the stationary holes 21 meets the phosgene solution from the rotating holes 59. The two streams mix and flow together up the vertical grooves 17 and out as in Example 1.

In this example, the amine solution and phosgene solution are brought together in a mixing chamber ½″ x ¼″ x the circumference of the rotor. The residence time in the mixing chamber is 0.007 second and in the vertical channels is 0.15 second. The velocity of amine solution through the holes is 30 feet per second. The phosgene solution has a radial and opposing velocity of 30 ft./second plus a peripheral speed of 44 ft./second. The amine solution cannot escape from the mixing chamber until it reaches the peripheral speed of the grooves of 44 ft./second. Thus, the flow entering the vertical grooves is almost certain to be homogeneous.

The method of phosgenation described in this example results in a yield of tolylene diisocyanate slightly lower than in Example 1.

Example 3

In this example, the apparatus is modified to give different conditions of mixing and reacting, but the flow rates, concentrations and temperatures are the same as in Example 1.

In accordance with FIGURE 5, the phosgene solution enters at nozzle 13 and flows into a space below the rotor and flows at high velocity through 20 holes 59 in the rotor. Lands 15 are provided on either side of each role 59 to form 20 mixing compartments 17.

The amine solution enters at nozzle 19 and flows at high velocity through 24 holes and then into the 20 mixing compartments. The amine solution flow is a pulsing flow such that there are 6720 introductions of amine solution in accord with each introduction followed by a phosgene solution flush.

The flows leaving the mixing compartments 17 enter the reaction zone where they combine and spiral upward through an annular space where most of the reaction takes place in a residence time of 0.35 second.

This method results in a yield of tolylene diisocyanate slightly lower than Example 1.

Example 4

In this example, the same apparatus and method is employed as in Example 1 except that the amine feed stream is a solution of 4,4'-diamino-diphenylmethane. The resulting yield of 4,4'-diphenylmethane diisocyanate is about 92% of theoretical.

Example 5

In this example, the same apparatus and method is employed as in Example 1 except that the amine feed stream is a solution of a mixture of tolylene diamine isomers of approximately the following composition:

|  | Percent |
|---|---|
| 1-methyl-2,4-diaminobenzene | 77 |
| 1-methyl-2,6-diaminobenzene | 20 |
| 1 - methyl - 2,3-diaminobenzene and 1-methyl-3,4-diaminobenzene | 3 |

The resulting yield of tolylene diisocyanate is about 87% of theoretical.

Example 6

In this example, the same apparatus and method is employed as in Example 1, except that the amine feed solution is 3,4-dichloroaniline. For this process, the preferred solvent is mono-chlorbenzene with a solvent to amine ratio of 4:1 to 8:1. The phosgene solution feed should provide about twice the phosgene theoretically required. The yield of 3,4-dichlophenyl isocyanate is about 90% of theoretical.

It is, of course, to be understood that any of the organic amines and any of the solvents set forth above may be used in place of those specifically set forth in the examples and that the examples are for the purpose of illustration and not of limitation.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:
1. An apparatus for rapidly mixing two liquid streams together which comprises a chamber having walls defined by a surface of rotation, a rotor rotatably disposed and closely fitting within said walls, said rotor having a plurality of lands and grooves, said grooves being substantially separated from each other by said lands and juxtaposed portions of said walls, said lands and said grooves extending the entire longitudinal length of said rotor, a first inlet means for continuously introducing a first solution into said grooves, said first inlet means including an opening in said wall of said chamber below said rotor, a second inlet means for intermittently introducing a second solution into said grooves, said second inlet means including a plurality of openings in the wall of said chamber adjacent to said rotor, said lands of said rotor operating in conjunction with said plurality of openings to interrupt the introduction of said second solution into said grooves as said rotor is rotated about its axis, and a means for discharging the mixtures of said first and second solutions from said chamber.

2. An apparatus for rapidly mixing two liquid streams together which comprises a chamber having walls defined by a surface of rotation, a rotor rotatably disposed and closely fitting within said walls, said rotor having a plurality of lands and grooves, said grooves being substantially separated from each other by said lands and juxtaposed portions of said walls, a first inlet means for continuously introducing a first solution into said grooves, said first inlet means including an opening in said wall of said chamber below said rotor, a second inlet means for intermittently introducing a second solution into said grooves, said second inlet means including a plurality of openings in the wall of said chamber adjacent to said rotor, said lands of said rotor operating in conjunction with said plurality of openings to interrupt the introduction of said second solution into said grooves as said rotor is rotated above its axis, said lands and said grooves extending only a portion of the entire longitudinal length of said rotor, a plurality of protuberances extending from said rotor above said lands and grooves and a means for discharging the mixtures of said first and second solutions from said chamber.

References Cited by the Examiner
UNITED STATES PATENTS

| | | | |
|---|---|---|---|
| 1,685,929 | 10/1928 | Mount | 23—283 |
| 2,257,533 | 9/1941 | Reich | 23—283 |
| 2,680,127 | 6/1954 | Slocombe et al. | 260—453 |
| 2,875,226 | 2/1959 | Bloom et al. | 260—453 |
| 3,179,380 | 4/1965 | Drayer | 259—8 |
| 3,235,231 | 2/1966 | Dietze et al. | 259—7 |

MORRIS O. WOLK, *Primary Examiner.*

CHARLES B. PARKER, JAMES H. TAYMAN, JR.,
*Examiners.*

D. R. MAHANAND, *Assistant Examiner.*